United States Patent
Fukuta

(10) Patent No.: US 8,056,140 B2
(45) Date of Patent: Nov. 8, 2011

(54) MULTIFUNCTION PERIPHERAL AND METHOD FOR CONTROLLING THE SAME

(75) Inventor: Shigenori Fukuta, Kawaguchi (JP)

(73) Assignee: Canon Kabushiki Kaisha, Tokyo (JP)

( * ) Notice: Subject to any disclaimer, the term of this patent is extended or adjusted under 35 U.S.C. 154(b) by 815 days.

(21) Appl. No.: 11/771,699

(22) Filed: Jun. 29, 2007

(65) Prior Publication Data

US 2008/0127307 A1 May 29, 2008

(30) Foreign Application Priority Data

Jul. 4, 2006 (JP) .................................. 2006-184844

(51) Int. Cl.
*G06F 7/04* (2006.01)
(52) U.S. Cl. ............. 726/26; 726/27; 713/193; 713/194
(58) Field of Classification Search .................. 713/194, 713/182; 358/1.1, 1.13, 1.15; 707/9; 726/26, 726/27

See application file for complete search history.

(56) References Cited

U.S. PATENT DOCUMENTS

| | | | |
|---|---|---|---|
| 7,546,054 B2 * | 6/2009 | Murakoshi | 399/80 |
| 2005/0108549 A1 * | 5/2005 | Kanai | 713/182 |
| 2006/0059198 A1 * | 3/2006 | Uchida et al. | 707/104.1 |
| 2006/0077416 A1 * | 4/2006 | Kittaka | 358/1.14 |
| 2006/0221358 A1 * | 10/2006 | Takahashi | 358/1.1 |
| 2006/0279780 A1 * | 12/2006 | Anno et al. | 358/1.15 |
| 2007/0083935 A1 * | 4/2007 | Uchikawa et al. | 726/26 |
| 2007/0133044 A1 * | 6/2007 | Tanaka | 358/1.15 |
| 2007/0136292 A1 * | 6/2007 | Ohara | 707/9 |
| 2007/0206205 A1 * | 9/2007 | Suzuki | 358/1.1 |
| 2007/0266057 A1 * | 11/2007 | Utsumi | 707/203 |
| 2008/0123124 A1 * | 5/2008 | Smithson | 358/1.13 |

FOREIGN PATENT DOCUMENTS

| | | |
|---|---|---|
| JP | 2002-063008 A1 | 2/2002 |
| JP | 2004-289302 A1 | 10/2004 |

* cited by examiner

*Primary Examiner* — Nabil El Hady
(74) *Attorney, Agent, or Firm* — Canon U.S.A., Inc. I.P. Division

(57) ABSTRACT

A job processing apparatus that can communicate with a security server configured to manage an access right to data, executes a job for inputting data, stores data resulting from execution of the job, determines whether an access right to the stored data is managed by the security server, and automatically sets information for enabling the security server to manage an access right to the data when no access right to the stored data is managed by the security server.

8 Claims, 17 Drawing Sheets

FIG. 11

| DOCUMENT ID | USER ID OR GROUP ID | ACCESS RIGHT ||||| 
|---|---|---|---|---|---|---|
| | | VIEW | CHANGE | DELETE | PRINT | PRINT SETTING STAMP |
| #1 | USER A | ○ | ○ | ○ | ○ | NOT REQUIRED |
| | USER B | ○ | ○ | | ○ | COPY PROHIBITED |
| | USER C | ○ | | | | |
| | USER D | ○ | | | ○ | NOT REQUIRED |
| #2 | USER A | ○ | | | | |
| | USER B | ○ | ○ | ○ | ○ | CONFIDENTIAL |
| | USER C | ○ | | | ○ | CONFIDENTIAL |

FIG. 15

| USER NAME | ACCESS RIGHT | | | | | |
|---|---|---|---|---|---|---|
| | VIEW | CHANGE | DELETE | COPY | PRINT | WATERMARK PRINTING |
| USER A | ○ | ○ | ○ | ○ | ○ | NOT REQUIRED |
| USER B | ○ | ○ | | ○ | ○ | COPY |
| USER C | ○ | | | | | |
| USER D | ○ | | | | ○ | CONFIDENTIAL |

MULTIFUNCTION PERIPHERAL AND METHOD FOR CONTROLLING THE SAME

BACKGROUND OF THE INVENTION

1. Field of the Invention

The present invention relates to a multifunction peripheral, a method for controlling the multifunction peripheral, and an image processing system including the multifunction peripheral.

2. Description of the Related Art

From the viewpoint of privacy protection, governmental or municipal agencies and other general offices/companies are recently required to strictly prevent any leakage of business secrets and personal information. In this respect, the exchange of information using electronic document data includes a higher risk of leaking information due to excellent mobility.

There is a system in which a security policy is issued by an application of a host computer (PC). According to this system, a user is allowed to request setting a security policy for each document data when the user creates the document data. The application, which generates or edits document data, sets the security policy based on instructions given by the user.

For example, the security policy may allow both a user A and a user B to view document data. However, the security policy may prohibit any other user but the user A from editing and printing the document data. In this manner, the security policy indicates the right of each user to access a document. The access right includes permission of each operation (e.g., view (display), editing, and printing) applied to a document. The security policy may include the term of validity being set for each document.

The policy information having been set is stored in a policy management server (policy server) so that every user can view the policy information by logging into the policy server. If the user B requests accessing document data to which a security policy is set, a PC application logs into the policy server and obtains policy information of the requested document data. The PC application confirms various restrictions (including function restrictions) being set for the user B by referring to the obtained policy information.

Then, the PC application determines permission/prohibition of each processing. For example, if the policy information indicates that the user B is prohibited from editing the document data, the PC application does not permit the user B to edit the document data. If the policy information indicates that the user B is prohibited from printing the document data, the PC application does not permit the user B to print the document data.

As discussed in Japanese Patent Application Laid-Open No. 2002-063008, there is a system in which a security policy is issued by a printing apparatus. According to this system, a policy server stores a list of users who are allowed to use the printing apparatus. If any user requests printing document data via a PC or other information terminal apparatus, this system restricts each user using the printing apparatus based on the user list obtained by logging into the policy server.

Furthermore, as discussed in Japanese Patent Application Laid-Open No. 2004-289302, if an information processing apparatus is a multifunction peripheral (MFP), the server can store a user list that describes permission with respect to a plurality of functions of the MFP. If any user requests one of the MFP functions, the system restricts each user in the use of every functions of the MFP based on the user list obtained from the server.

However, systems using the above-described policy server may not be available for all host computers. This issue should be addressed when establishing a highly secure system. More specifically, if a word processing application that can use the policy server is unavailable for an apparatus, this apparatus cannot control access to any document based on policy. For example, when the MFP (i.e., an apparatus other than a host computer) scans a document and registers scanned image data to a box (which is referred to as "Scan to Box" function), the MFP cannot set a security policy for the scanned image data.

SUMMARY OF THE INVENTION

Exemplary embodiments of the present invention are directed to a technique enabling a user to set a security policy for any data registered in a multifunction peripheral.

According to an aspect of the present invention, a job processing apparatus that can communicate with a security server configured to manage an access right to data includes a job execution unit configured to execute a job for inputting data, a storage unit configured to store data resulting from execution of the job, a detection unit configured to determine whether an access right to the data stored in the storage unit is managed by the security server, and an automatic setting unit configured to automatically set information for enabling the security server to manage an access right to the data when the detection unit determines that the security server does not manage an access right to the data stored in the storage unit.

According to another aspect of the present invention, a job processing apparatus that can communicate with a security server configured to manage an access right to data includes a storage unit configured to store input data, a discrimination unit configured to discriminate, from the data stored in the storage unit, between data having an access right managed by the security server and data having no access right managed by the security server, and a collective setting unit configured to collectively set information for enabling the security server to manage an access right to one or more data discriminated by the discrimination unit as having no access right managed by the security server among the data stored in the storage unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 11 illustrates exemplary access right information stored in a policy server according to an exemplary embodiment of the present invention.

FIG. 15 illustrates exemplary access right information relating to box document data stored in the MFP according to an exemplary embodiment of the present invention.

DETAILED DESCRIPTION OF THE EMBODIMENTS

Figure 1:
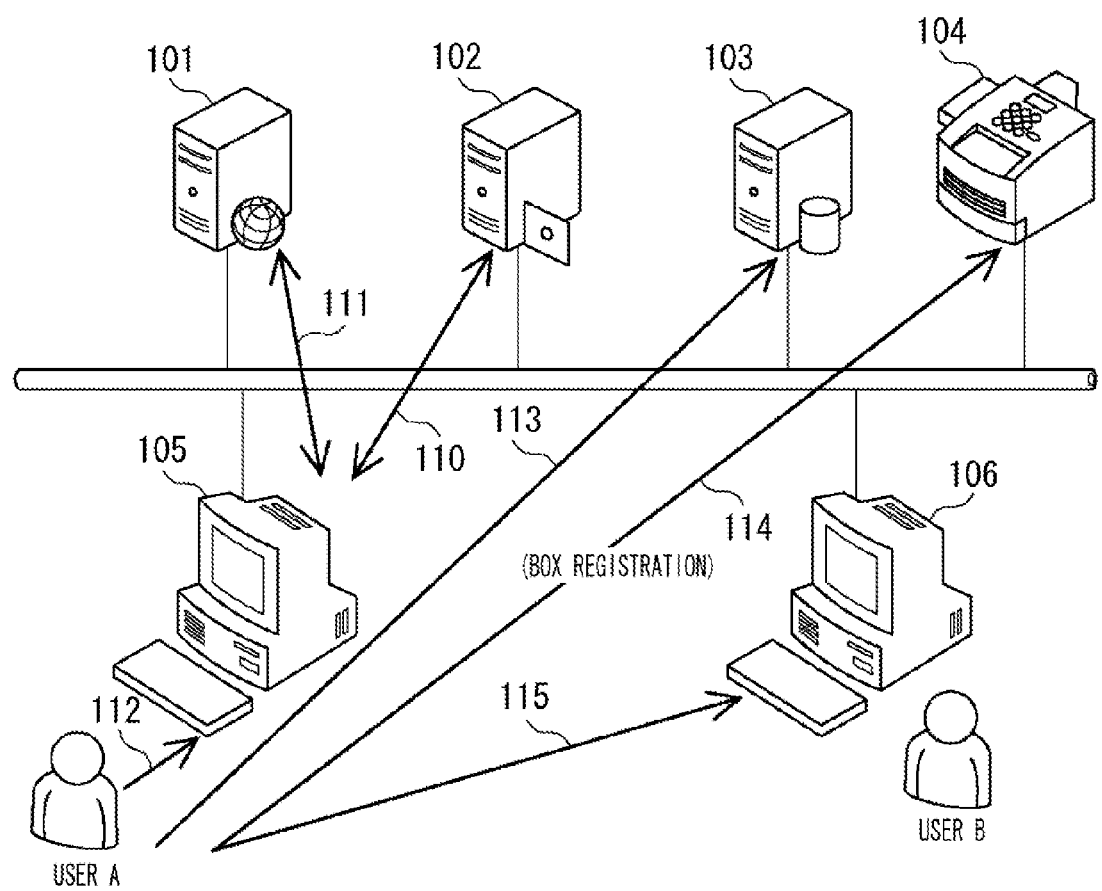
FIG. 1 illustrates a security system according to an exemplary embodiment of the present invention.

The following description of exemplary embodiments is merely illustrative in nature and is in no way intended to limit the invention, its application, or uses.

Processes, techniques, apparatus, and systems as known by one of ordinary skill in the art are intended to be part of the enabling description where appropriate.

For example, certain circuitry for image processing, data processing, and other uses may not be discussed in detail. However these systems and the methods to fabricate these system as known by one of ordinary skill in the relevant art is intended to be part of the enabling disclosure herein where appropriate.

It is noted that throughout the specification, similar reference numerals and letters refer to similar items in the following figures, and thus once an item is described in one figure, it may not be discussed for following figures.

An exemplary embodiment of the present invention provides a security system which is easy to use and is capable of enhancing the security of document data. More specifically, a security system includes a security server, which may be referred to as "policy server", and a multifunction peripheral (MFP).

This system allows a user, if the user is in an environment using a document application that cannot use a security server, to register document data to a box of the MFP. The security system according to the present embodiment processes document data generated by a PC application as well as image data generated by the MFP, which can scan a paper document.

The security policy, which may be simply referred to as "policy", according to the present embodiment can determine authorization or access right of various operations (e.g., view (display), edit, and print processing) applied to document data. Moreover, the security policy can define the term of validity of respective document data.

The MFP provides a "Scan to Box" function that enables a user to register a scanned image to a box. In this case, the security system according to the present embodiment executes the following processing if no security policy is set for document data stored:

(1) The security system enables a user to refer to a document list to determine whether any security policy is set for box document data. Namely, the security system separately manages box document data including a security policy and box document data including no security policy.

(2) The security system enables a user to set a document security policy for any box storage document data that includes no security policy via an MFP operation unit or a remote user interface (UI) and register the set security policy to a security server. The remote UI has a web server function for enabling a user to perform various settings via an operation unit of the MFP from an external host computer.

(3) The security system permits an owner of document data, e.g., a user who has performed the "Scan to Box" operation, to set a security policy based on the user authentication applied to any user who uses the MFP.

The present embodiment enables a user to set a security policy for any document data registered in a box even if the user is in an environment using a document application that cannot use a policy server. Furthermore, the present embodiment enables a user to set a security policy for any document data obtained from a "Scan to Box" operation using the MFP.

FIG. 1 illustrates a security system according to an exemplary embodiment of the present invention In FIG. 1, policy server 101 is security server that manages a security policy of a document. The policy server 101 realizes secure management of document data, including management of access, expiration, and replacement of delivered document data, as well as management of a user who can use the document data.

A user authentication server 102 prevents any unauthorized user from accessing this system. The user authentication server 102 can be omitted if the policy server 101 includes a user authentication function. A file server 103 stores document data files. A multifunction peripheral (MFP) 104 has multiple functions, e.g., copying, printing, scanning, and faxing, and can store document data. Two host computers (e.g., personal computers) 105 and 106 enable users to perform various operations relating to document data, e.g., creation of document files, browsing, and printing instructions.

The security system according to the present embodiment performs the following processing for generating document data, defining a security policy, and delivering the document data and the security policy:

(1) First, as indicated by an arrow 110 in FIG. 1, a user A accesses the user authentication server 102 via the host computer 105. The user authentication server 102 performs user authentication. Any user, if unauthorized by the user authentication server 102, cannot access this system. The user A may access the policy server 101, if the policy server 101 has a user authentication function, as indicated by an arrow 111 in FIG. 1.

(2) The host computer 105 enables the user A to generate document data. For example, the user A can generate a document file by using a word processing application installed on the host computer 105, as indicated by an arrow 112. The word processing application, which is cooperative with the policy server 101, can control access to a document based on a security policy.

(3) The policy server 101 registers a security policy of generated document data together with a document ID and user information. The policy server 101 can identify registered document data based on the document ID. The policy server 101 allocates a document ID to document data when a security policy is set for the document data. The security policy according to the present embodiment can define an access range and the term of validity for each user. For example, the policy server 101 can set a security policy for the user B (or a group to which the user B belongs) so that the user B can view document data during a validity term of 30 days although the user B cannot edit the document data. The access control using the policy server 101 is applied to any access to the document data by the word processing application of the host computer 105.

(4) The user A can deliver document data via a file server, an electronic mail, or a web site. The user A can register document data to the file server 103 as indicated by an arrow 113, transmit document data attached to a mail to the user B as indicated by an arrow 115, or store document data to a box of the MFP 104 as indicated by an arrow 114.

The security system according to the present embodiment enables any user who accesses the document data delivered from the host computer 105 to obtain a security policy from the policy server 101 and performs access control based on the security policy.

Next, with reference to FIG. 2, an example of the security policy that can be registered in the policy server 101 will be described. The security policy illustrated in FIG. 2 is a mere example and, therefore, the policy server 101 can define any other various settings and permission/prohibition.

Figure 2:
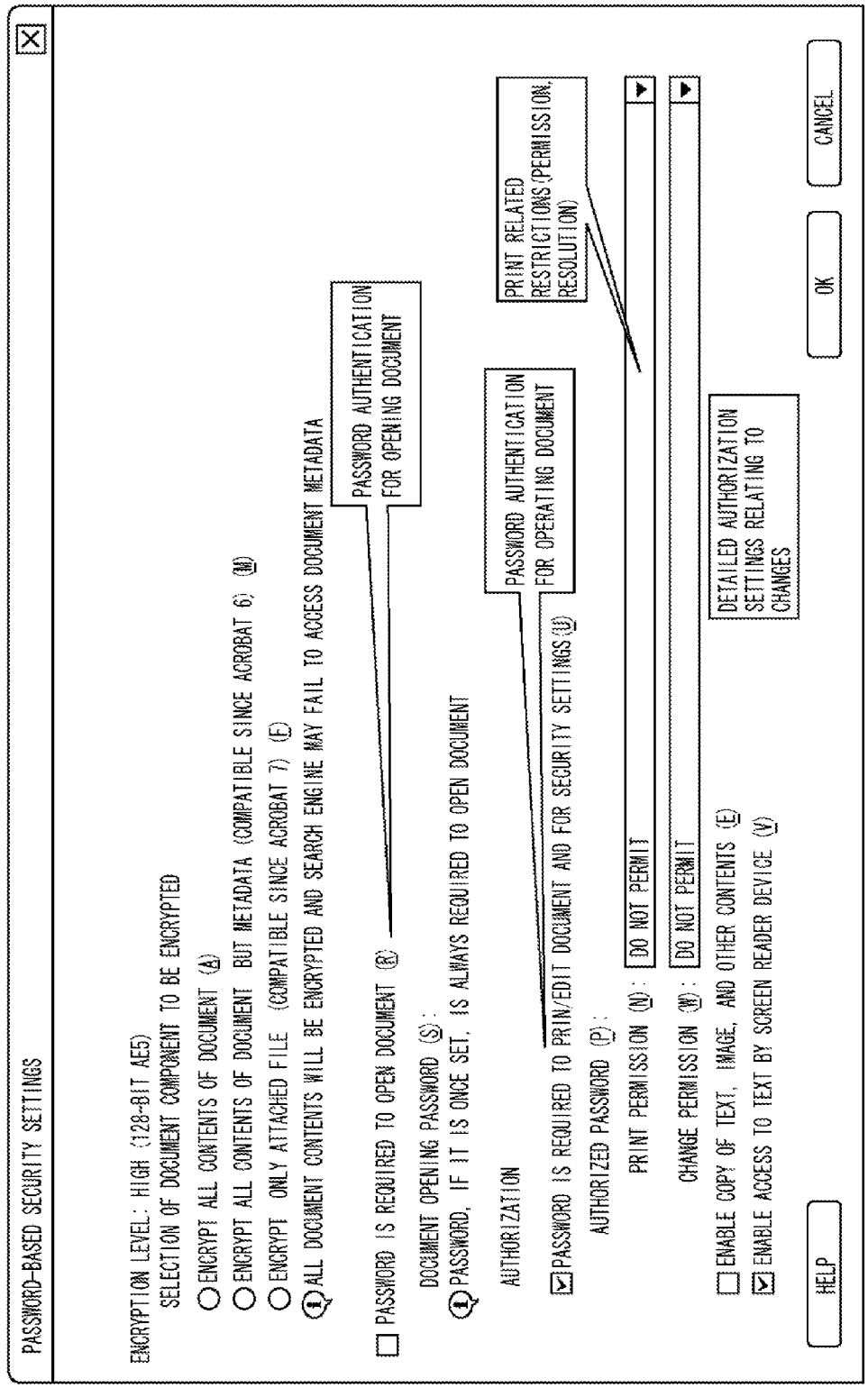
FIG. 2 illustrates an exemplary user interface (UI) screen of a host computer which indicates security setting processing according to an exemplary embodiment of the present invention.

FIG. 2 illustrates an exemplary user interface (UI) screen of the host computer 105 which indicates detailed contents of security setting processing. The policy server 101 enables the following authentication based on a password:
password authentication for opening a document file
password authentication relating to printing and editing
The policy server 101 enables the following print permission settings:
prohibition of printing
permission of low resolution (150 dpi) printing
permission of high resolution printing
The policy server 101 enables the following change permission settings:
prohibition of change
insertion, deletion, and rotation of a page
entry in a form field and signature in an existing signature field
generation of annotation, entry in a form field and signature in an existing signature field
all operations but extraction of a page
As described above, the security system according to the present embodiment enables a user to perform various security policy settings on the host computer 105 and register the set security policy to the policy server 101. The user sets the security policies via the UI screen illustrated in FIG. 2. The setting operation using the UI screen illustrated in FIG. 2 can be repeated if the security policy setting is required for a plurality of users.

Figure 3:
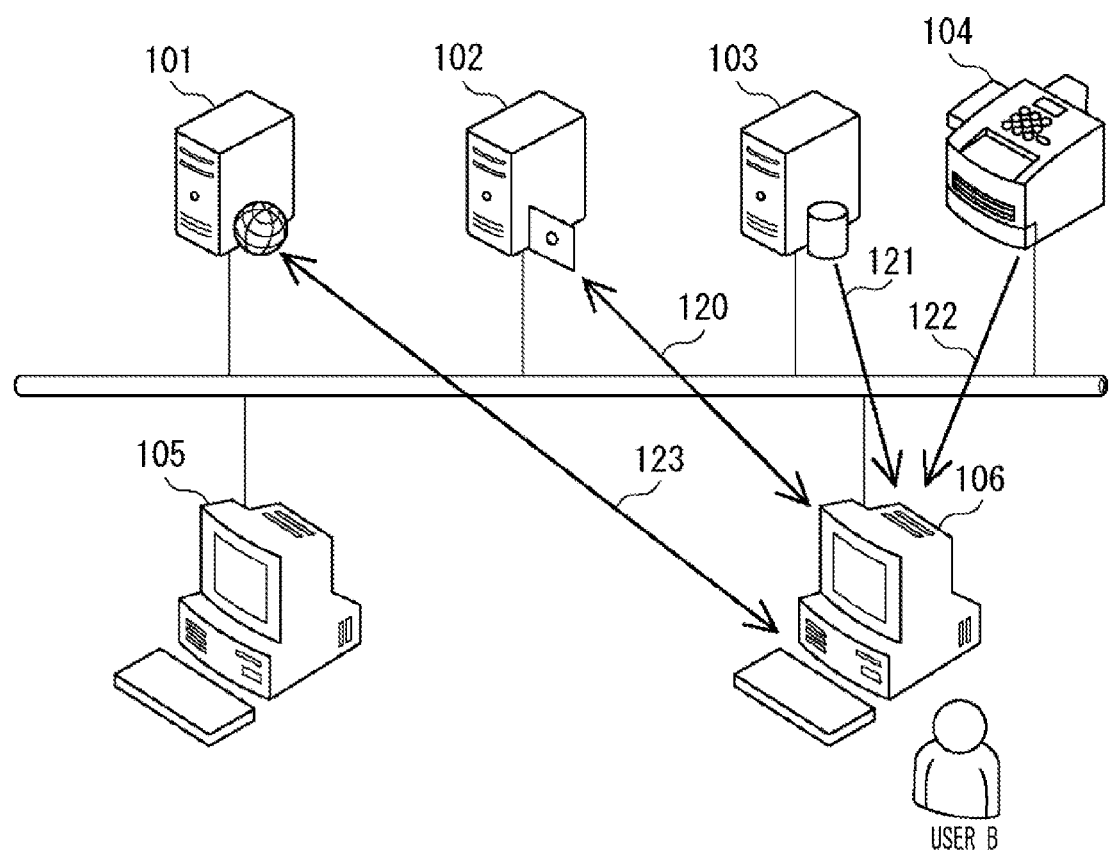
FIG. 3 illustrates exemplary processing performed by the security system for obtaining and operating document data according to an exemplary embodiment of the present invention.

FIG. 3 illustrates exemplary processing performed by the security system according to the present embodiment for obtaining and operating document data. According to the example illustrated in FIG. 3, the user B can access, via the host computer 106, document data that includes a security policy being set according to the above-described operation.

First, as indicated by an arrow 120, the user B accesses the user authentication server 102 via the host computer 106. The user authentication server 102 performs user authentication. Any user, if unauthorized by the user authentication server 102, cannot access this system.

The user B then starts operating document data using the host computer 106. More specifically, the user B obtains document data from the file server 103 as indicated by an arrow 121 or obtains document data from a box of the MFP 104 as indicated by an arrow 122. Then, the user B obtains a security policy of the document data having been set for the user B from the policy server 101 based on the ID of the document data as indicated by an arrow 123.

In this case, the user B can obtain only the security policy applied to the user B based on the ID of the document data and user information of the user B (e.g., a user ID managed by the user authentication server 102). The word processing application (or document viewer application) of the host computer 106 controls access to the document data based on the obtained security policy.

Figure 4:
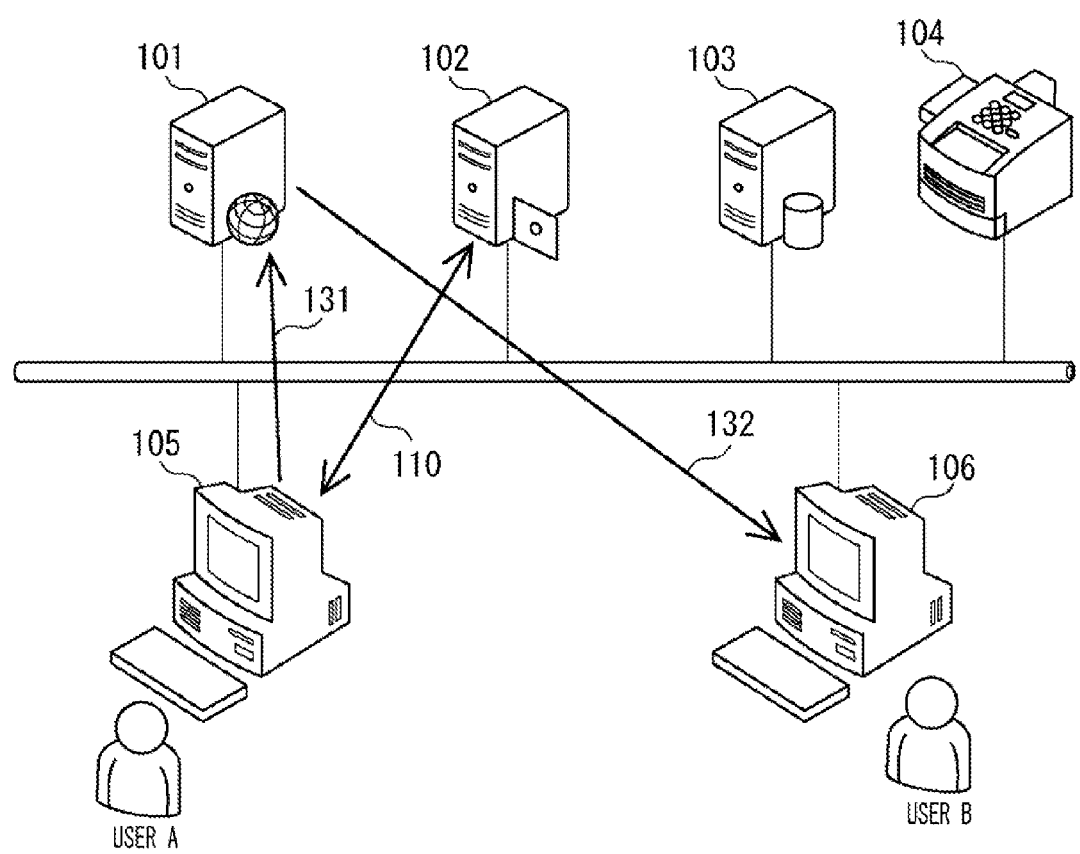
FIG. 4 illustrates an exemplary change of a security policy in the security system according to an exemplary embodiment of the present invention.

FIG. 4 illustrates exemplary security policy change processing performed by the security system according to the present embodiment.

First, as indicated by an arrow 110, the user A accesses the user authentication server 102 via the host computer 105. The user authentication server 102 performs user authentication. Any user, if unauthorized by the user authentication server 102, cannot access this system.

The user A, if authorized by the user authentication server 102, can change the security policy using a UI screen similar to that illustrated in FIG. 2 as indicated by an arrow 131. For example, as an exemplary change of the security policy, the policy server 101 can change the access right of the user B as indicated by an arrow 132. The changed security policy is applied to any access to the document data by the user B.

Figure 5:
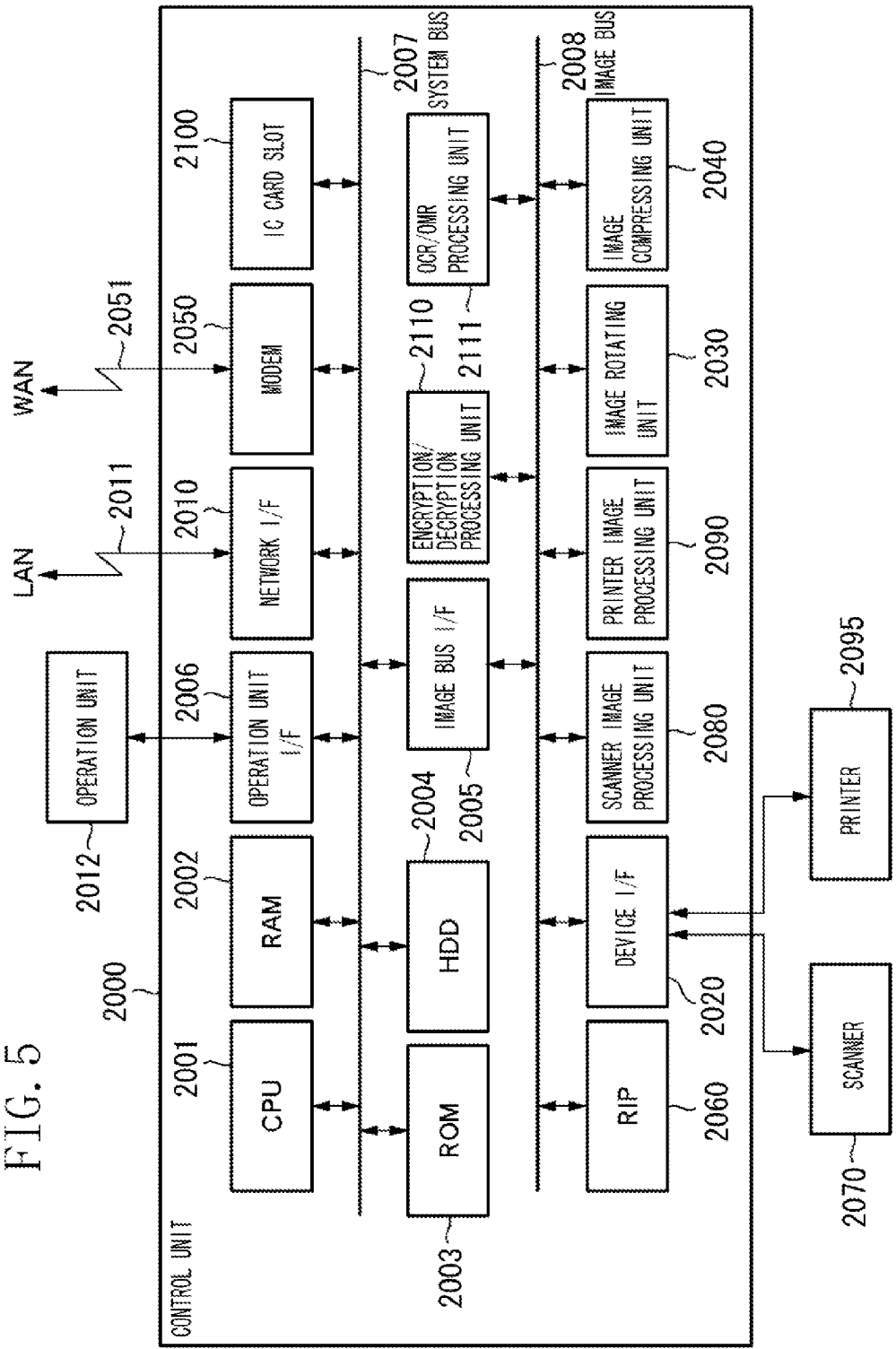
FIG. 5 is a block diagram illustrating the configuration of a multifunction processing apparatus (MFP) according to an exemplary embodiment of the present invention of the present invention.

FIG. 5 is a block diagram illustrating an exemplary configuration of the MFP 104 according to the present embodiment.

A control unit 2000 controls the input/output of image information and device information. The control unit 2000 is connected to a scanner 2070 (i.e., an image input device) and a printer 2095 (i.e., an image output device). The control unit 2000 is also connected to a LAN 2011 and a public telephone circuit (WAN) 2051.

A central processing unit (CPU) 2001 is a controller that controls the operation of the MFP 104. A random access memory (RAM) 2002 is a system work memory for the CPU 2001 and is capable of functioning as an image memory for temporarily storing image data. A read-only memory (ROM) 2003 is a boot ROM that stores a boot program of the MFP 104. A hard disk drive (HDD) 2004 stores an operating system (OS), system software, image data, and historical record data (which may be simply referred to as "log"). The HDD 2004 includes an image storage area which can be referred to as "box".

An operation unit interface (I/F) 2006 controls the interface between the control unit 2000 and an operation unit (UI) 2012 having a touch panel. The operation unit I/F 2006 can output image data to the operation unit 2012 that displays the received image data. Furthermore, the operation unit I/F 2006 can receive information input by a user via the operation unit 2012 and transmits the information to the CPU 2001.

A network I/F 2010, connected to the LAN 2011, controls input/output of information between the control unit 2000 and the LAN 2011. A modem 2050, connected to the public telephone circuit 2051, controls input/output of information between the control unit 2000 and the public telephone circuit 2051.

An IC card slot 2100, when an IC card is inserted by a user, can control input/output of an encryption/decryption key in response to input of appropriate personal identifier number (PIN) code. An image bus I/F 2005 is a bus bridge located between a system bus 2007 and an image bus 2008 for converting data structure. The image bus 2008 is capable of speedily transferring image data, and is for example a PCU bus or an IEEE1394 bus.

A raster image processor (RIP) 2060 rasterizes page description language (PDL) code into bitmap data. A device I/F unit 2020 can control synchronous/asynchronous processing of image data between the control unit 2000 and the image input/output device (i.e., the scanner 2070 and the printer 2095). A scanner image processing unit 2080 performs correction, modification, and editing processing for image data input by the scanner 2070.

A printer image processing unit 2090 performs correction and resolution conversion processing for print data. An image rotating unit 2030 rotates image data. An image compressing unit 2040 performs JPEG compression/expansion processing for multi-value image data and performs JBIG, MMR, or MH compression/expansion processing for binary image data. An encryption/decryption processing unit 2110 is a hardware accelerator board that performs data encryption and decryption processing using a key stored in the IC card slot 2100. An OCR/OMR processing unit 2111 decodes character information or two-dimensional bar code included in image data and converts the decoded information into character code.

Figure 6:
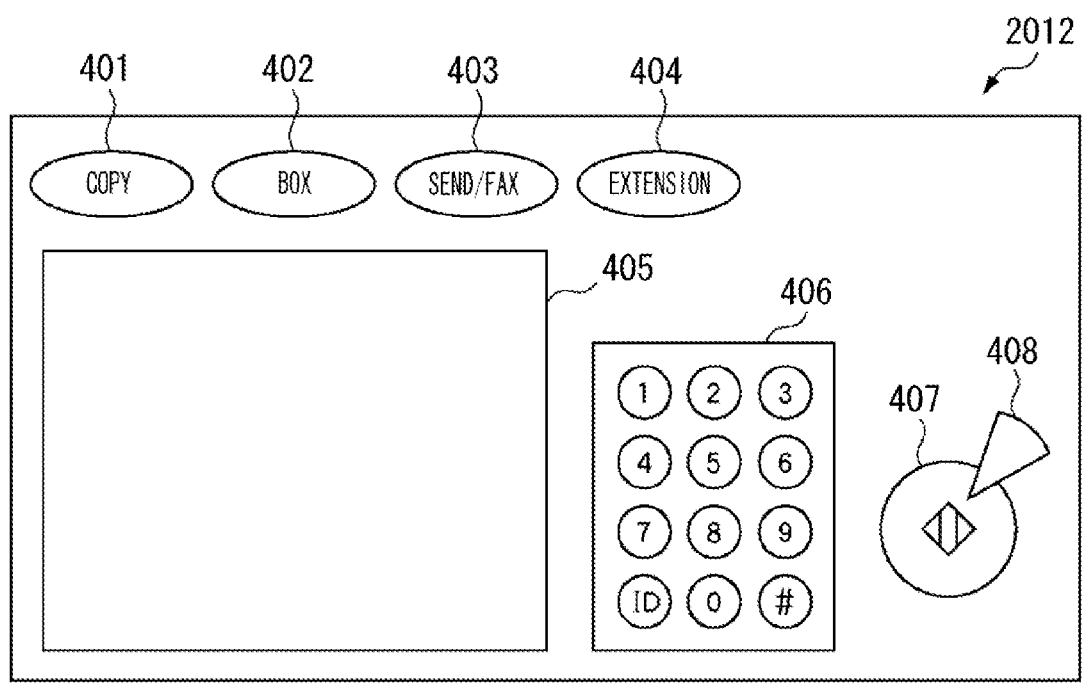
FIG. 6 illustrates an appearance of an operation unit of the MFP according to an exemplary embodiment of the present invention.

FIG. 6 illustrates an appearance of the operation unit 2012 of the MFP 104 according to the present embodiment.

The operation unit 2012 includes a numeric keypad 406, a start key 407, a stop key 408, a liquid crystal display unit 405 (e.g., a touch panel), a "copy" function key 401, a "box" function key 402, a "send/fax" function key 403, an "extension" function key 404. The numeric keypad 406 enables a user to input numerical values. The start key 407 enables a user to initiate a copy operation or a scanning operation. The stop key 408 enables a user to interrupt a copy or scanning operation.

The MFP 104 performs a copy function when a user pushes the "copy" function key 401 and performs a box function when a user pushes the "box" function key 402. According to the box function of the present embodiment, the MFP 104 enables a user to store various data into a private box area in the hard disk 2004 of the MFP 104, which is allocated to each user or each division.

The MFP 104 can rasterize print data (PDL data) transmitted from the host computer 105 and store the rasterized image data in the box. In the present embodiment, this function (or operation) can be referred to as a "store job" or "PDL to Box" job. Furthermore, when the scanner 2070 performs a scanning operation, the MFP 104 can store the read image data into the box. This function (or operation) can be referred to as a "Scan to Box" job.

The box can store image data of each job together with attribute information attached to the image data. The image data stored in the box can be referred to as "box document data." The box function of the MFP 104 enables a user to perform various processing (e.g., printing and deleting of the box document data) at arbitrary timing.

The "send/fax" function key 403 enables a user to transmit document data, such as box document data, to a host computer or other apparatus via a network. The "extension" function key 404 enables a user to perform processing for PDL data.

Figure 7:
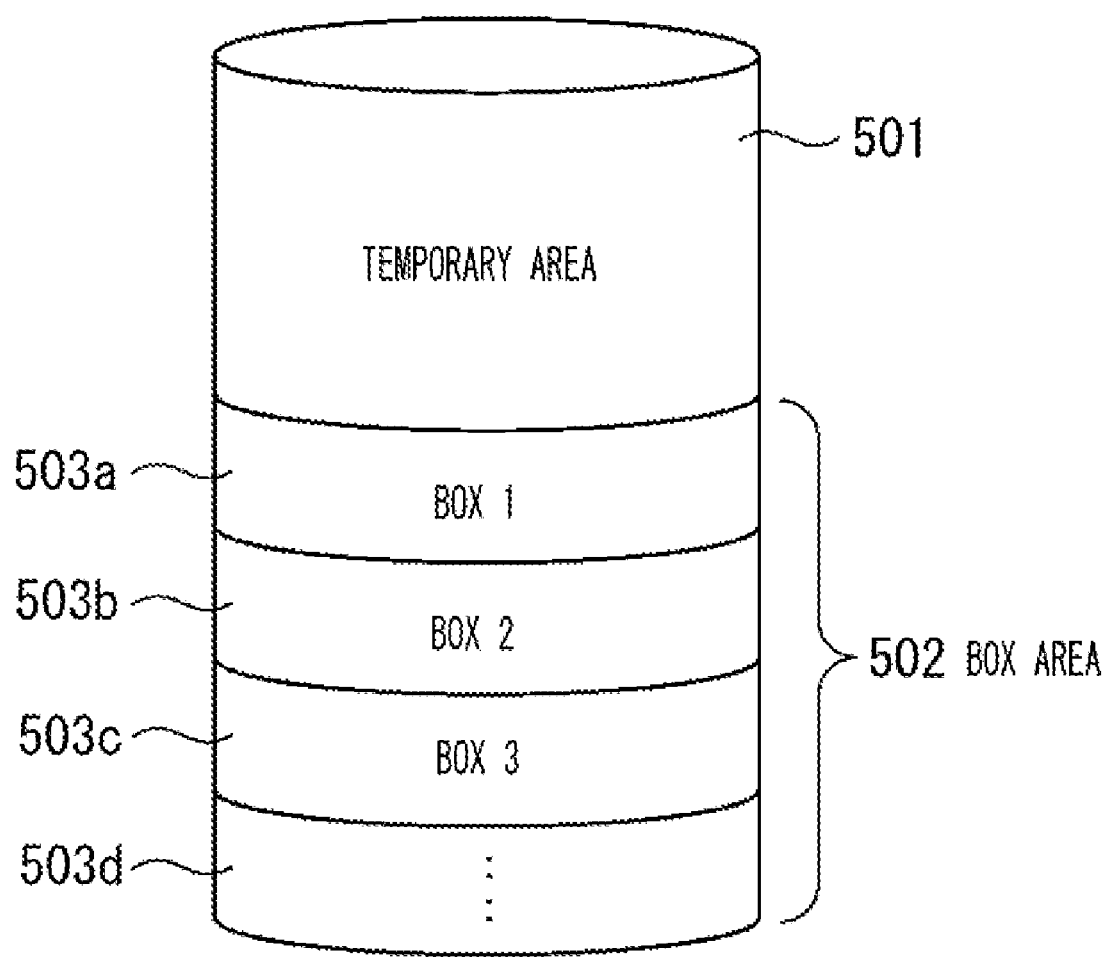
FIG. 7 illustrates an exemplary box for a box function of the MFP according to an exemplary embodiment of the present invention.

FIG. 7 illustrates an exemplary box for the box function of the MFP 104 according to the present embodiment.

The hard disk 2004 of the MFP 104 includes a temporary area 501 and a box area 502. The temporary area 501 can temporarily store image data. For example, the temporary area 501 can be used for electronic sort of image data to change an output order of image data, or when a plurality of copies of a document is required. The temporary area 501 can store scanned image data so that only one scanning operation by the scanner 2070 is performed for the copy processing.

The temporary area 501 can also be used to temporarily store any data stored in the box area 502, image data rasterized from PDL data, and image data obtained by the scanner 2070. The data stored in the temporary area 501 is deleted upon completion of the processing.

The box area 502 includes a plurality of storage areas 503a through 503d, which can be used for the box function of the MFP 104. Each of the storage areas 503a through 503d are referred to as a "box" and can be allocated to individual users (or divisions of a company). For example, a user can store a "PDL to Box" job or a "Scan to Box" job into a designated box or into a private box of the user.

When the box function is selected by a user, who has pushed the "box" function key 402 of the operation unit 2012, the MFP 104 enables the user to change the settings of any job stored in the box and perform various processing including print output and job transfer.

In the present embodiment, the MFP 104 accepts an operation by a user based on user authentication. The MFP 104 manages each box area in relation to an identified user. For example, the box 1 (503a) stores box document data of the user A. The HDD 2004 includes an area (not illustrated) which stores information indicating an association between each box area and a user thereof.

According to the present embodiment, no security policy is set for document data (image data) registered in a box based on a "Scan to Box" job. Therefore, a security policy is set for the document data so that an access right is given to an authenticated user or a user associated with a registered box.

Figure 8:
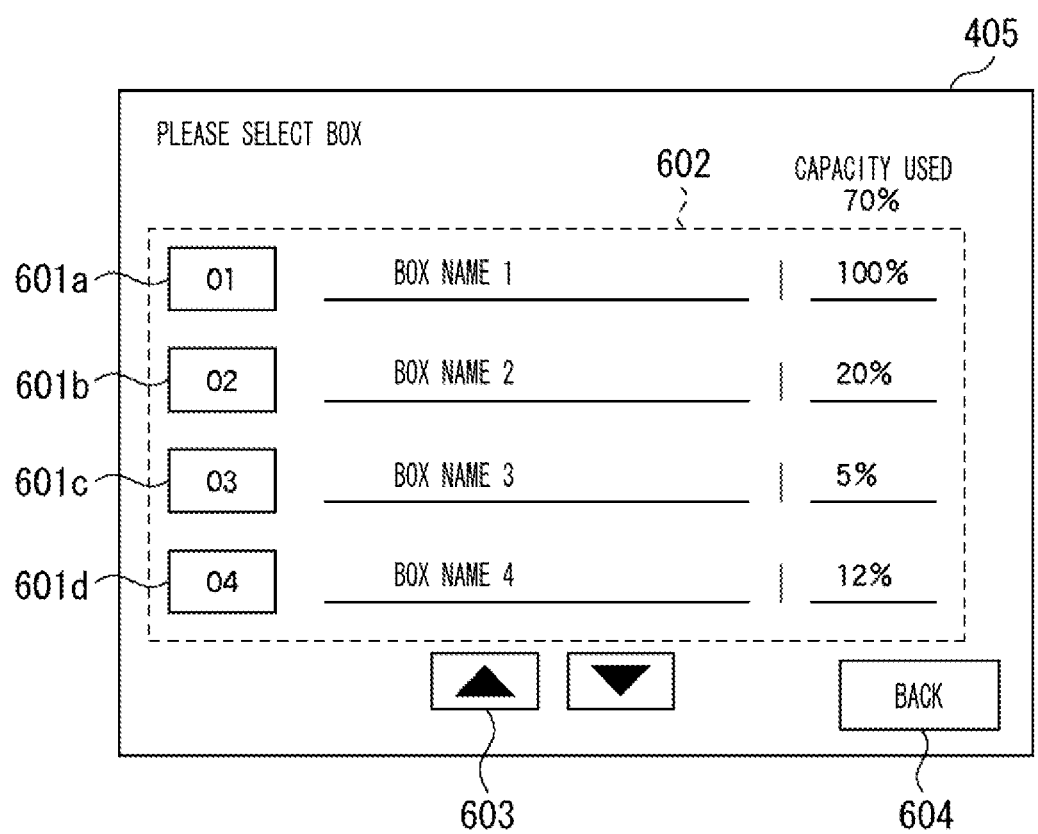
FIG. 8 illustrates an initial screen for the box function according to an exemplary embodiment of the present invention, which is displayed on a liquid crystal display unit when a user pushes a "box" function key of the operation unit of the MFP.

FIG. 8 illustrates an initial screen for the box function of the MFP 104 according to the present embodiment, which is displayed on the liquid crystal display unit 405 when a user pushes the "box" function key 402 of the operation unit 2012.

The screen illustrated in FIG. 8 enables a user to select a box that the user wants to use. A screen area 602 displays box names corresponding to box numbers 601a through 601d, together with the percentage of capacity of the hard disk 2004 capacity used by each box area.

A scroll button 603 enables a user to scroll through a plurality of boxes displayed on the screen area in the vertical direction. A "back" key 604 enables a user to return the display content to the previous screen.

Figure 9:
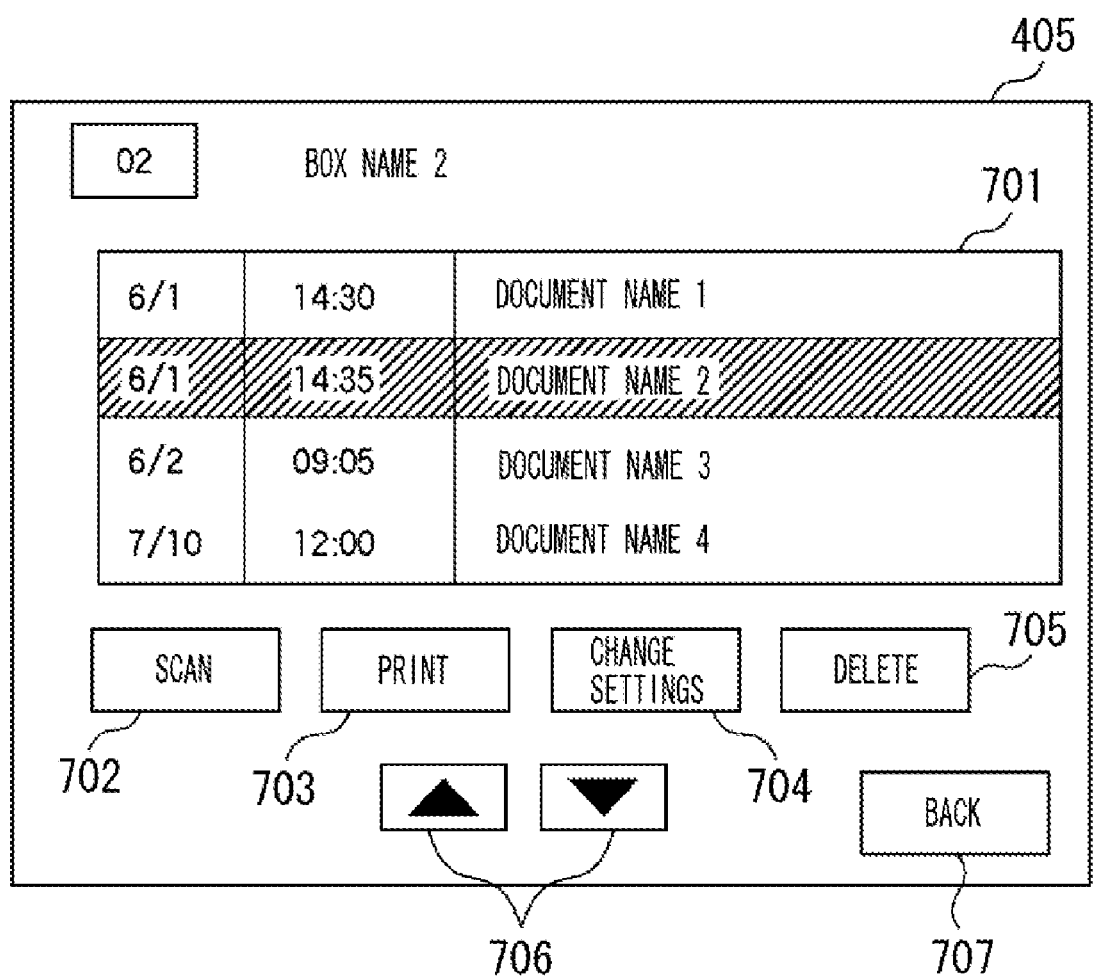
FIG. 9 illustrates exemplary contents displayed on the liquid crystal display unit if a user selects "box name 2" on the screen of FIG. 8.

FIG. 9 illustrates exemplary contents displayed on the liquid crystal display unit 405 when a user selects "box name 2" on the screen of FIG. 8.

A display area 701 indicates a list of box document data stored in the box of "box name 2", including storage date/time of respective box document data and document names. If a user pushes a displayed line of a document name, the display area 701 highlights the line indicating the corresponding box document data. FIG. 9 illustrates an exemplary state where the "document name 2" is selected.

A "scan" key 702 enables a user to add image data obtained by the scanner 2070 as box document data to a selected box. A "print" key 703 enables a user to instruct printing of document data corresponding to the highlighted line. A "change settings" key 704 enables a user to change print settings for document data of a selected job. For example, the "change settings" key 704 enables a user to change the number of copies to print or to add print functions. A "delete" key 705 enables a user to delete selected document data. A "vertical scroll" key 706 enables a user to vertically scroll through the contents displayed on the liquid crystal display unit 405, when all box document data of a plurality of jobs cannot be simultaneously displayed in the display area 701. A "back" key 707 enables a user to display the previous screen illustrated in FIG. 8.

The security system including the policy server 101 and the MFP 104 performs the following processing according to the present embodiment. A document application installed on the host computer 105 cannot use the policy server 101. Therefore, the user A sets a security policy of box document data, after the box document data has been registered, using the operation unit 2012 of the MFP 104 or a remote UI.

Figure 10:
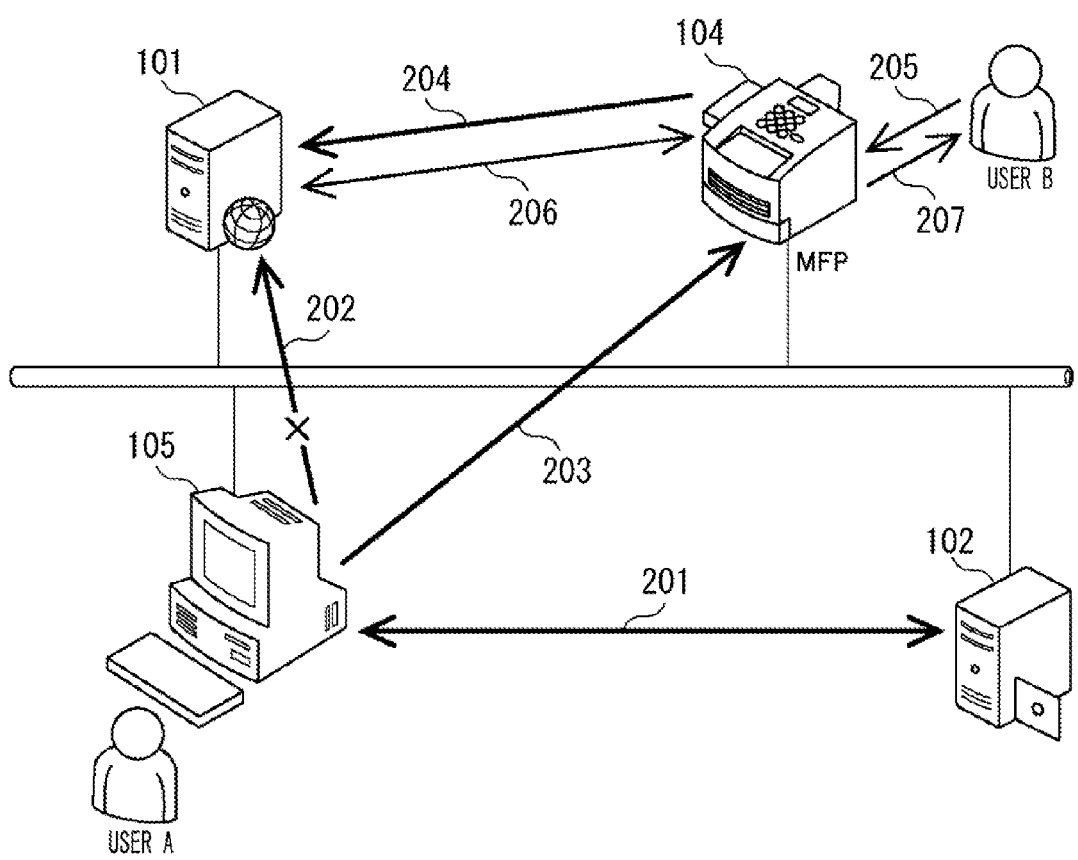
FIG. 10 illustrates exemplary security policy setting processing performed by the security system according to an exemplary embodiment of the present invention.

FIG. 10 illustrates exemplary security policy setting processing performed by the security system according to the present embodiment. It is assumed that, when the user A operates the host computer 105, any document application installed on the host computer 105 cannot use the policy server 101.

First, the user A accesses the user authentication server 102 via the host computer 105. The user authentication server 102 performs user authentication as indicated by an arrow 201. Any user, if unauthorized by the user authentication server 102, cannot access this system.

The user A, if authorized by the user authentication server 102, can generate document data with the host computer 105. For example, the user A generates a document file using a word processing application.

In this case, the user A cannot set a security policy for document data on the host computer 105 as indicated by an arrow 202. Thus, the user A cannot register any security policy for the document data to the policy server 101.

Then, the user A registers the document data to a box of the MFP 104 as indicated by an arrow 203. If no security policy is set for the document data, the user A sets a security policy for the document data using the operation unit 2012 of the MFP 104 or a remote UI and registers the set security policy, together with user information and a document ID, to the policy server 101 as indicated by an arrow 204. Thus, any security policy registered and managed by the policy server 101 can be identified based on the document ID. The security policy can be applied to the document data.

The MFP 104 can automatically set a security policy if it is detected that any document data registered in a box includes no security policy. For example, the MFP 104 can register, to the policy server 101, any security policy that gives an access right to a user having registered the document data (i.e., the user A according to the example illustrated in FIG. 10). Then, the MFP 104 can set the registered security policy to the document data.

Furthermore, the MFP 104 can register, to the policy server 101, any security policy that gives an access right to an owner of the box which stores the registered document data. Then, the MFP 104 can set the registered security policy to the document data. Furthermore, the MFP 104 can set a security policy that gives an access right to both the user having registered the document data and the owner of the box which stores the registered document data. Exemplary automatic security policy setting performed by the MFP 104 is described below.

Thus, the security system according to the present embodiment can prevent any document data that does not include a security policy from being stored in a box of the MFP 104. As a result, the security system according to the present embodiment can enhance the security of box data stored in the MFP 104.

FIG. 11 illustrates an exemplary security policy (access right information) stored in the policy server 101 according to the present embodiment. The box document data includes a unique document ID, which is different from the access right information. Accordingly, determining whether any access right information is set for the document data can be accomplished by checking whether any document ID is allocated to document data. A document, if any document ID is allocated to its document data, can be referred to as "document including a security policy" in the following description.

The access right information illustrated in FIG. 11 includes a user name (or group ID) 1102 and an access right 1103 registered for each document ID. The user name (or group ID) 1102 is a unique name that can identify a user of document data. The user authentication server 102 manages the user name (or group ID) 1102. The access right 1103 can be independently set for each user with respect to individual document data.

In the present embodiment, the access right is set for each user. However, the access right can be set for a group to which a user belongs. The access right 1103 defines permission/prohibition of various operations (e.g., view, change, delete, copy, and print) relating to electronic document data. In FIG. 11, a circle attached to a field indicates "permission" and a blank field indicates "prohibition." Furthermore, the access right 1103 can include detailed printing settings in addition to permission/prohibition settings.

The access right information illustrated in FIG. 11 includes stamp print settings. The stamp printing is a function of the MFP 104 that can print a stamp image such as "copy prohibited" or "confidential" on each page of document data in a printing operation of the document data. Any other stamp image, such as "in-house use only" or "draft", can be arbitrarily printed. The access right can designate an image to be used for the stamp printing. The printing settings can include any copy-forgery-inhibited-pattern image in addition to stamp images. Furthermore, the access right information can include the term of validity for each document.

It is now assumed that the user B (i.e., an operator of the MFP 104) requests operating any box document data as indicated by an arrow 205 (FIG. 10). In response to the box document data operation request by the user B, the MFP 104 causes the policy server 101 to confirm the security policy of a requested document based on a document ID of the requested document as indicated by an arrow 206. In this case, the MFP 104 can obtain only the security policy applied to the user B based on the document ID and user information.

The obtained security policy is applied to the box document data. The user B is allowed to operate the MFP 104 for processing the document under an access control based on the security policy as indicated by an arrow 207.

The processing flow including registration of box document data and printing of registered document data will be described in detail below with reference to FIGS. 12 through 14.

Figure 12:
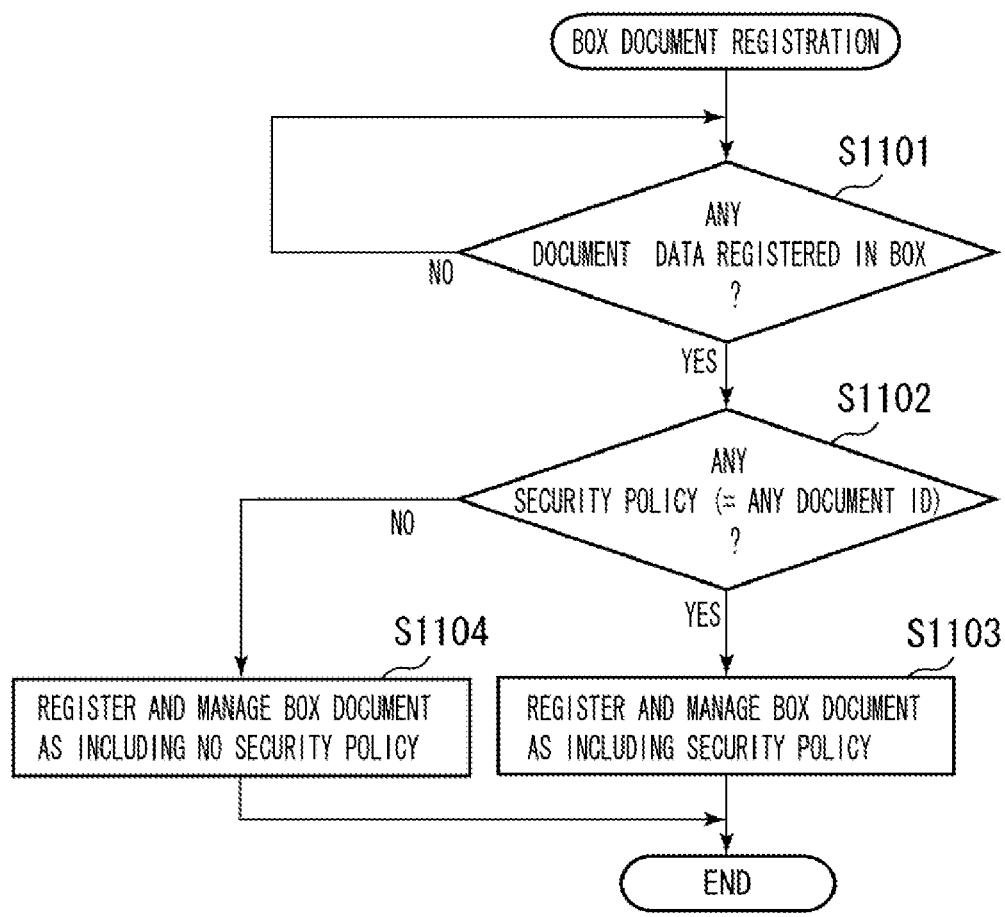
FIG. 12 is a flowchart illustrating exemplary processing for determining whether any security policy is set for box document data registered in the MFP according to an exemplary embodiment of the present invention.

FIG. 12 is a flowchart illustrating exemplary processing for determining whether any security policy is set for document data registered in a box of the MFP 104 according to the present embodiment. A program corresponding to the processing illustrated in FIG. 12 is loaded into the RAM 2002 and executed under the control of the CPU 2001.

First, in step S1101, the CPU 2001 determines whether there is any document data registered in a box. If any registered document data is present (YES in step S1101), the processing flow proceeds to step S1102. In step S1102, the CPU 2001 determines whether there is any security policy being set for the document data. Namely, the CPU 2001 determines whether the document data includes any document ID. If the CPU 2001 determines that any security policy being set is present (YES in step S1102), the processing flow proceeds to step S1103.

In step S1103, the CPU 2001 registers and manages the box document as including a security policy. If the CPU 2001 determines that no security policy being set is present (NO in step S1102), the processing flow proceeds to step S1104. In step S1104, the CPU 2001 registers and manages the box document as including no security policy.

Figure 13:
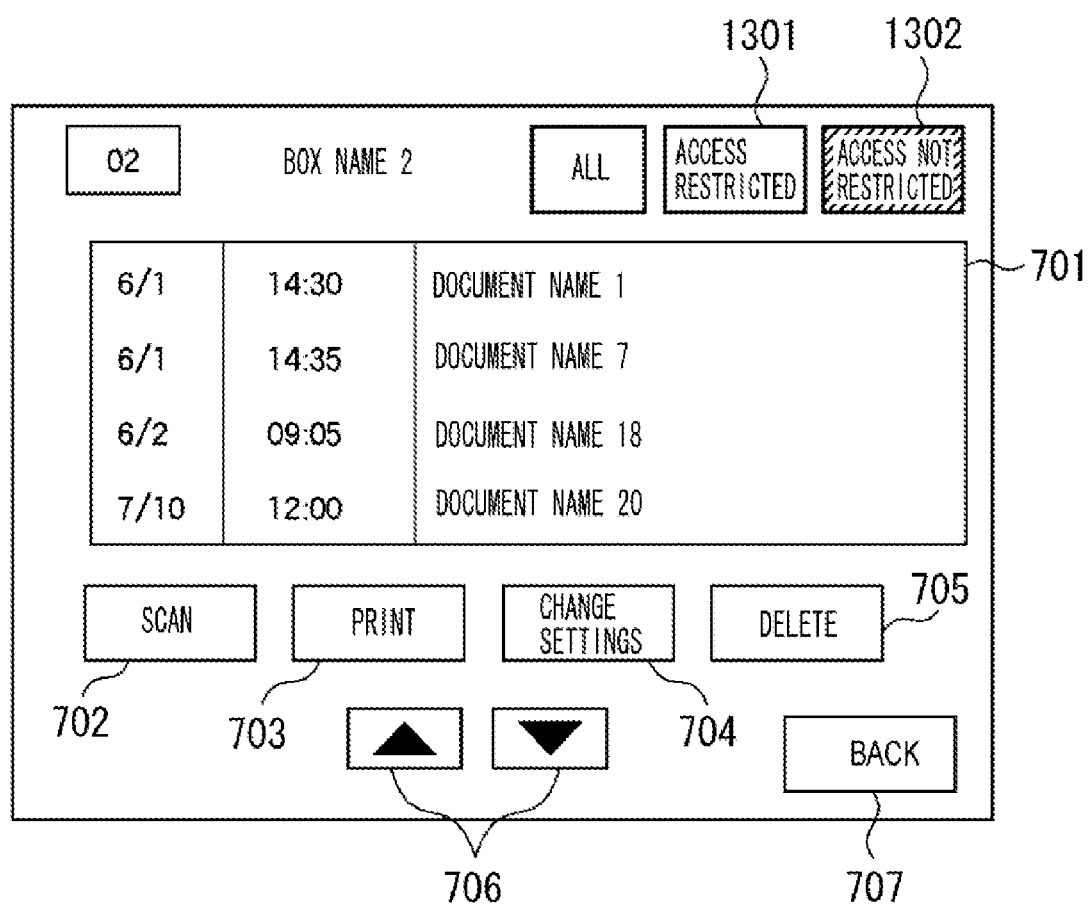
FIG. 13 illustrates exemplary display contents including a list of box document data registered in the MFP according to an exemplary embodiment of the present invention.

FIG. 13 illustrates exemplary display contents including a list of document data registered in a box of the MFP 104 according to the present embodiment.

The display contents of FIG. 13 vary depending on the instruction state of an "access restricted" button 1301 and an "access not restricted" button 1302 of the operation unit 2012. According to the example illustrated in FIG. 13, as the "access not restricted" button 1302 is selected, only document names of the document data to which no security policy is set are displayed among the document data registered in a box.

Figure 14:
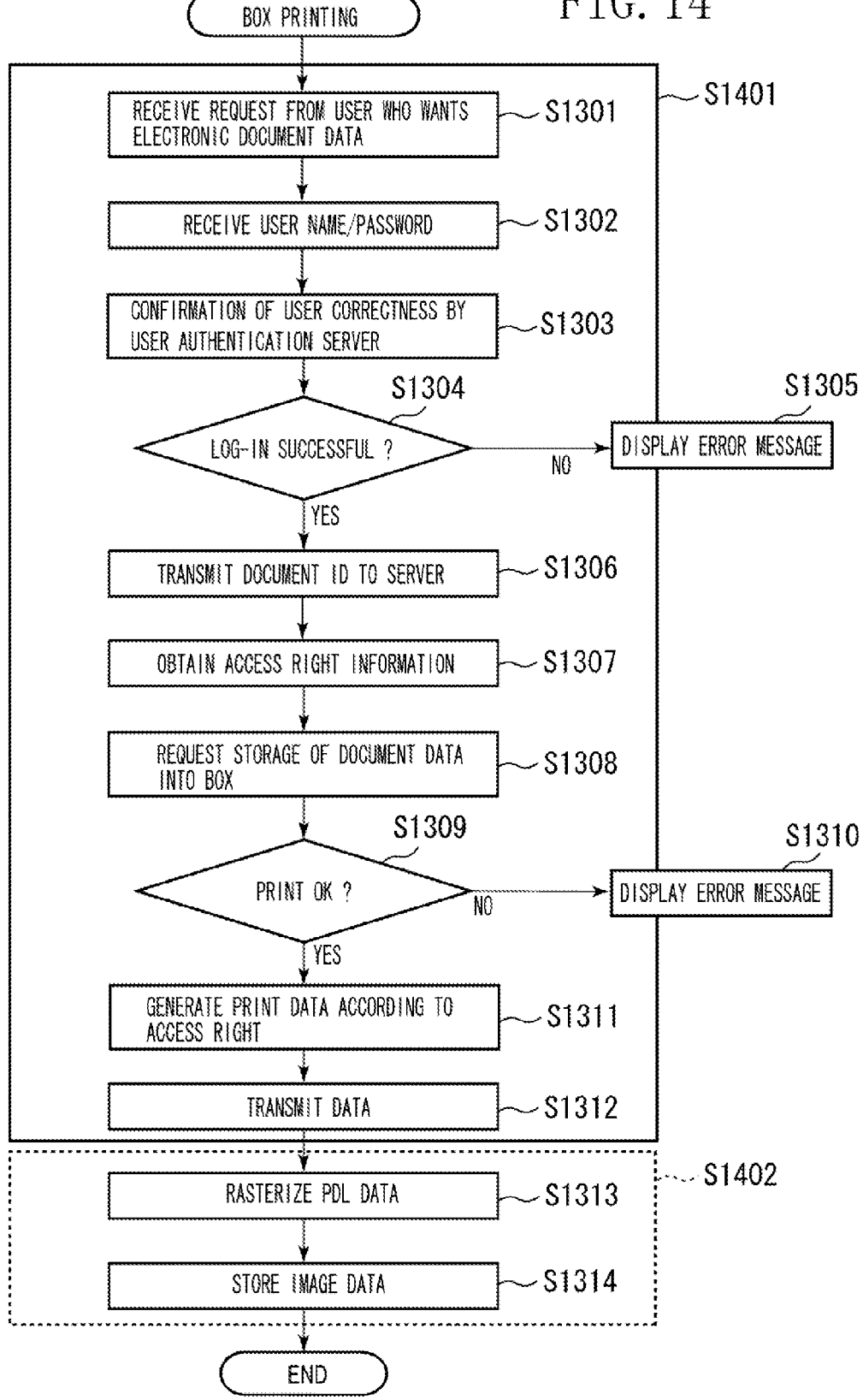
FIG. 14 is a flowchart illustrating storage and print processing of box document data according to an exemplary embodiment of the present invention.

FIG. 14 is a flowchart illustrating storage and print processing of box document data according to the present embodiment. The flowchart of FIG. 14 includes processing 1401 executed by the host computer 105 and processing 1402 executed by the MFP 104.

In step S1301, the host computer 105 receives a request from a user who wants to use electronic document data. The host computer 105 displays a predetermined screen (not illustrated) that enables the user to enter a user name and a password. In step S1302, the host computer 105 receives a user name and a password entered by the user. In step S1303, the host computer 105 causes the user authentication server 102 to authenticate the user based on the received user name and the password.

In step S1304, the host computer 105 determines whether the user has been authenticated. In other words, the host computer 105 determines whether the user's log-in processing is successful. If the user's log-in processing fails (NO in step S1304), the processing flow proceeds to step S1305. In step S1305, the host computer 105 displays an error message indicating failure of the log-in processing. The host computer 105 can execute the processing of steps S1302 through S1304 before executing the processing of step S1301, for example, as part of a startup operation of the host computer 105.

If the user's log-in processing is successful (YES in step S1304), the processing flow proceeds to step S1306. In step S1306, the host computer 105 transmits a document ID attached to the document data together with user information to the policy server 101. In step S1307, the host computer 105 obtains access right information corresponding to the user from the policy server 101.

In step S1308, the host computer 105 receives a request from the user who wants to store the document data into a box of the MFP 104. The host computer 105 obtains a print access right from the user's access right information. Then, in step S1309, the host computer 105 determines whether the user is permitted to print the document. If the print permission is not given to the user (NO in step S1309), the processing flow proceeds to step S1310. In step S1310, the host computer 105 displays an error message indicating that printing is prohibited.

In the present embodiment, an operation for registering a document generated with the host computer 105 to a box of the MFP 104 is allowed when the security policy includes the print permission. In many cases, when a document is registered from the host computer 105 to the MFP 104, the document registered in the MFP 104 is later printed out from the MFP 104. Thus, the permission/prohibition of this operation is determined based on the printing permission.

Furthermore, when the host computer 105 registers a document to the MFP 104, the host computer 105 sends print data to the MFP 104. Therefore, it is useful to use the print permission as the type of operation permission in this case. However, any other operation permission can be applied depending on an environment of the system.

If printing of the document data is permitted (YES in step S1309), the processing flow proceeds to step S1311. In step S1311, the host computer 105 generates print data based on the access right of the user. After the print data is generated, the processing flow proceeds to step S1312. In step S1312, the host computer 105 transmits to the MFP 104 the print data together with the document ID attached to the document data and the access right information applied to the document data.

In step S1313, the MFP 104 determines that a job for storing document data into a box is received and the MFP 104 converts the print data into image data. In step S1314, the MFP 104 attaches the transmitted document ID to the converted image data and stores the image data into a box of the MFP 104 designated by the user.

The MFP 104 can execute security policy setting processing for document data stored in a box in the following manner: (1) The MFP 104 provides a job list to enable a user to determine whether there is any security policy being set for document data. If required, the MFP 104 can display a list of document data to which no security policy is set as illustrated in FIG. 13.

(2) The MFP 104 enables a user to select any document data including no security policy via the operation unit 2102 of the MFP 104 or a remote UI (e.g., a display screen of the host computer 105 or 106) and enables the user to set a security policy for the selected document data. In this case, a user can set the same security policy for a plurality of document data by using, for example, the operation screen illustrated in FIG. 2 which can be displayed on the operation unit 2102 of the MFP 104 or on a remote UI (e.g., the display screen of the host computer 105 or 106).

(3) The MFP 104 registers the security policy set for the document data to the policy server 101.

Thus, a user can easily set a security policy for a plurality of document data stored in the box of the MFP 104.

An exemplary operation performed by the security system according to the present embodiment, which relates to the above-described processing of the MFP 104, is described below with reference to FIG. 10.

First, as indicated by an arrow 201, the user A accesses the user authentication server 102 via the host computer 105. The user authentication server 102 performs user authentication. Any user, if unauthorized by the user authentication server 102, cannot access this system.

The user A, if authorized by the user authentication server 102, can generate document data on the host computer 105. For example, the user A generates a document file using a word processing application. In this case, the user A cannot set a security policy for document data using the word processing application as indicated by an arrow 202. Thus, the user A cannot register any security policy to the policy server 101.

Then, the user A registers the document data including no security policy to a box of the MFP 104 as indicated by an arrow 203. The user A selects any box document data registered in the MFP 104 that does not include a security policy via the operation unit 2012 of the MFP 104 or a remote UI. The user A sets the same security policy for the selected document data. Subsequently, the MFP 104 registers the security policy set for the document data together with a document ID to the policy server 101. Thus, any security policy registered and managed by the policy server 101 can be identified based on the document ID.

FIG. 15 illustrates exemplary access right information relating to box document data stored in the MFP 104 according to the present embodiment, as an example of setting contents of a security policy which can be set by a user via the operation unit 2102 of the MFP 104 or a remote UI.

In FIG. 15, access right information 1501 includes a user name 1502 and an access right 1503. The user name 1502 is a unique name that can identify a user of document data. The user authentication server 102 manages the user name. The access right 1503 can be independently set for each user. In the present embodiment, the access right is set for each user. However, the access right can be set for a group to which a user belongs. The access right 1503 defines permission/prohibition of various operations (e.g., view, change, delete, copy, and print) relating to electronic document data. In FIG. 15, a circle attached to a field indicates "permission." Furthermore, the access right 1503 can include detailed printing settings in addition to permission/prohibition settings.

The access right information illustrated in FIG. 15 includes watermark print settings. The watermark printing is a function of the MFP 104 that can print a watermark image such as "copy" or "confidential" on each page of document data in a printing operation of the document data. Any other watermark image, such as "in-house use only" or "draft", can be arbitrarily printed. The access right can designate an image to be used for the watermark printing. Furthermore, the access right information may include stamp print settings as described with reference to FIG. 11.

It is now assumed that the user B (i.e., a creator of document data) requests operating any box document data registered in the MFP 104. In response to the box document data operation request by the user B, the MFP 104 causes the policy server 101 to confirm the security policy of the requested document data based on its document ID. The obtained security policy obtained from the policy server 101 is applied to the box document data. The MFP 104 performs access control based on the obtained security policy.

Furthermore, the MFP 104 can automatically set a security policy for a plurality of document data which do not include a security policy. For example, the MFP 104 can register, to the policy server 101, any security policy that gives an access right to a user having registered the document (i.e., the user A according to the example illustrated in FIG. 10). Then, the MFP 104 can set the registered security policy to the plurality of document data.

Furthermore, the MFP 104 can register, to the policy server 101, any security policy that gives an access right to an owner of the box which stores the registered document data. Then, the MFP 104 can set the registered security policy to the plurality of document data. Furthermore, the MFP 104 can set a security policy that gives an access right to both the user having registered the document data and the owner of the box which stores the registered document data. Then, the MFP 104 can set the registered security policy to the plurality of document data.

Figure 16:
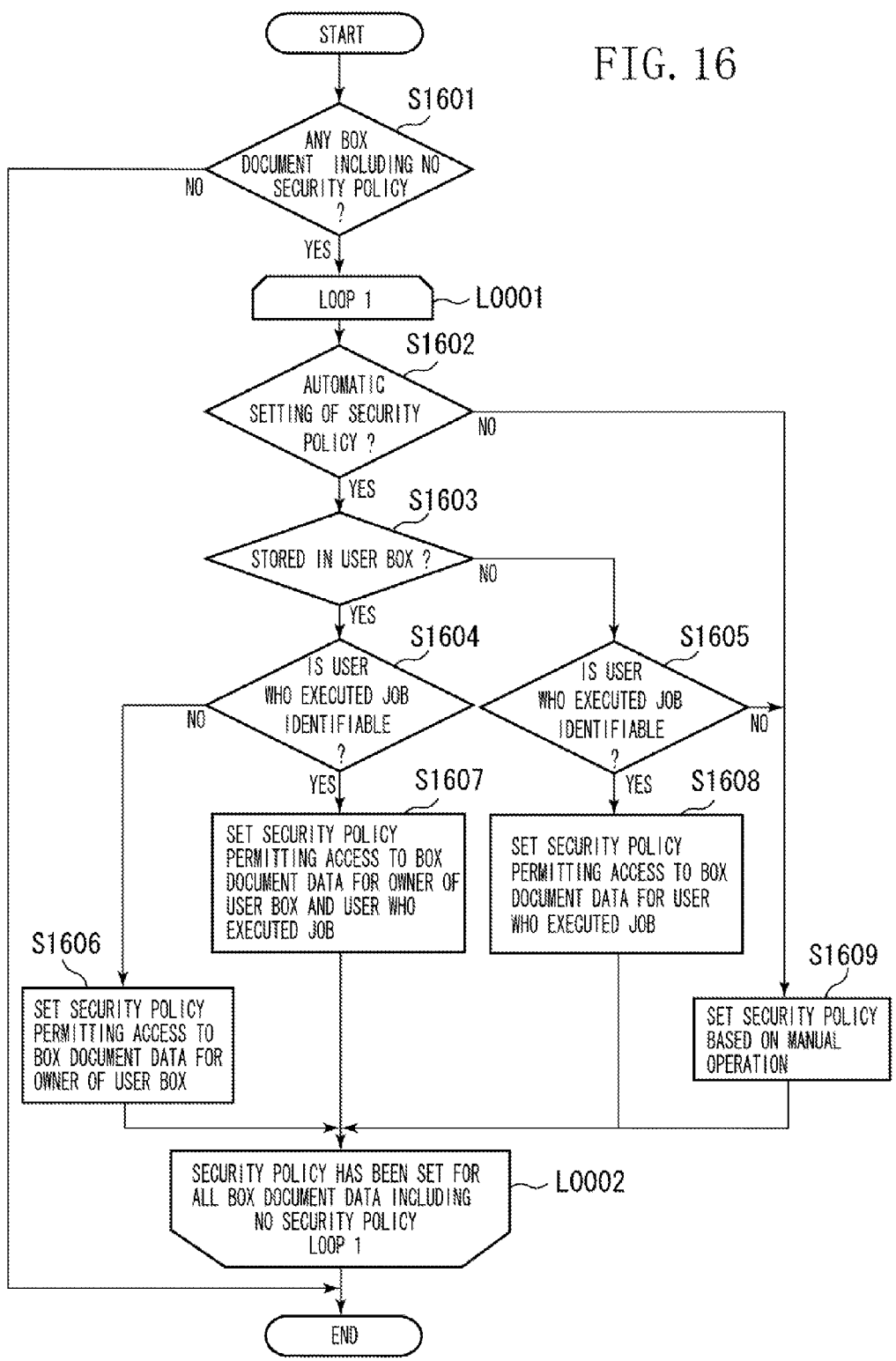
FIG. 16 is a flowchart illustrating exemplary processing of the MFP that automatically sets a security policy for document data having no security policy according to an exemplary embodiment of the present invention.

FIG. 16 is a flowchart illustrating exemplary processing of the MFP 104 that automatically sets a security policy. A program corresponding to the processing illustrated in FIG. 16 is loaded into the RAM 2002 and executed under the control of the CPU 2001.

First, in step S1601, the CPU 2001 determines whether there is any box document data that does not have a security policy. If there is no box document data without a security policy (NO in step S1601), the CPU 2001 terminates the processing of this routine. If any box document data without a security policy is present (YES in step S1601), the CPU 2001 repeatedly executes the processing of loop 1 (from L0001 to L0002) for the box document data.

In step S1602, the CPU 2001 determines whether automatic setting of a security policy is required for the box document data without a security policy. The determination with respect to the automatic setting of a security policy can be set beforehand for the MFP 104 and the setting content is stored the HDD 2004. Thus, in step S1602, the CPU 2001 reads the setting content from the HDD 2004 and determines whether the automatic setting of a security policy is required.

Figure 17:
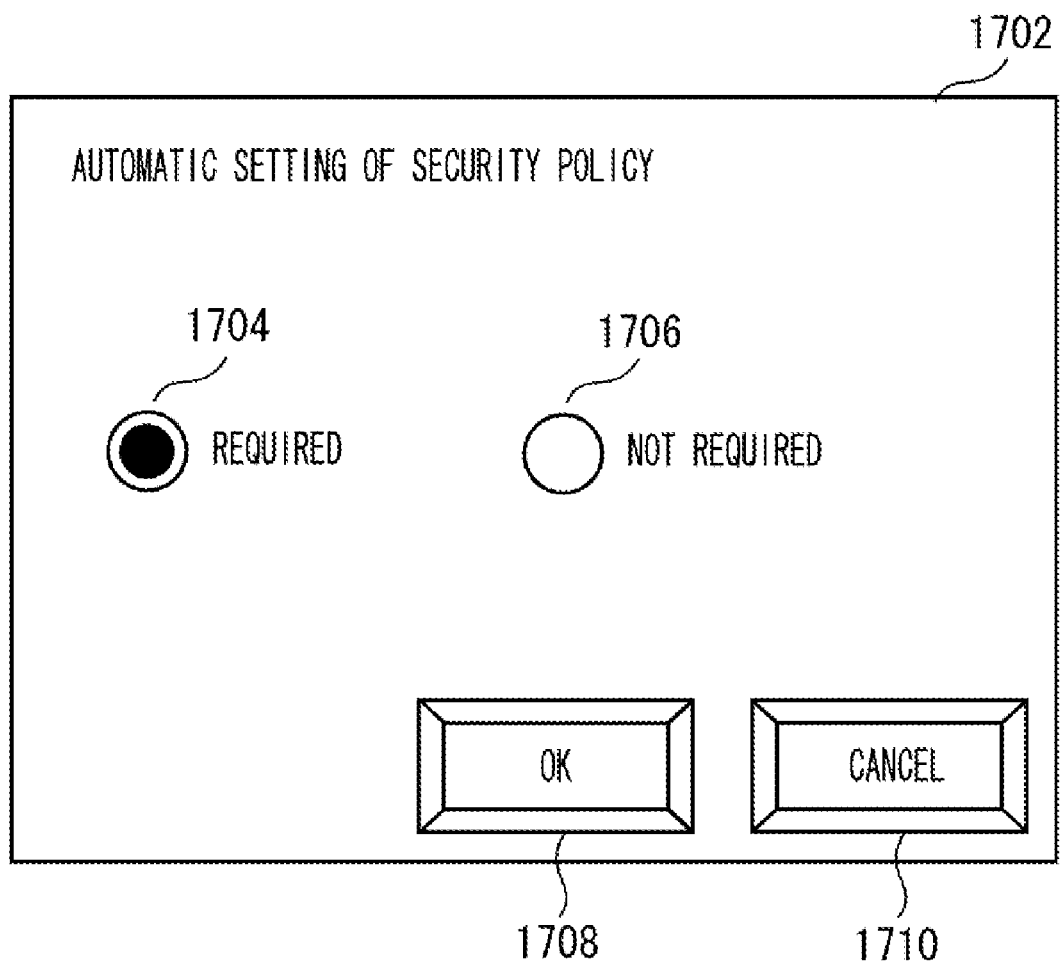
FIG. 17 illustrates an exemplary operation screen which enables a user to determine whether a security policy is automatically set according to an exemplary embodiment of the present invention.

FIG. 17 illustrates an exemplary operation screen which enables a user to determine whether a security policy is automatically set to the MFP 104. An operation screen 1702 is displayed on the operation unit 2012. A radio button 1704 enables the user to instruct automatic setting of a security policy. FIG. 17 illustrates a state where "automatic setting of a security policy" is selected by the user. A radio button 1706 enables the user to cancel "automatic setting of a security policy." An OK button 1708 enables the user to fix the setting content on the operation screen 1702 and store the setting content in the HDD 2004. A cancel button 1710 enables the user to cancel the setting content on the operation screen 1702.

Referring back to FIG. 16, if the CPU 2001 determines that the automatic setting of a security policy is required (YES in step S1602), the processing flow proceeds to step S1603. In step S1603, the CPU 2001 determines whether the box document data without a security policy is stored in the user box. If any box document data without a security policy is stored in the user box (YES in step S1603), the processing flow proceeds to step S1604. Otherwise (NO in step S1603), the processing flow proceeds to step S1605.

In step S1604, the CPU 2001 determines whether the CPU 2001 can identify a user who has executed a job for storing the document data into the user box. If the CPU 2001 can identify the user having executed a job for storing the document data into the user box (YES in step S1604), the processing flow proceeds to step S1607. Otherwise (NO in step S1604), the processing flow proceeds to step S1606.

In step S1606, the CPU 2001 sets a security policy permitting access to the box document data for a user corresponding to the user box, i.e., an owner of the user box. In step S1607, the CPU 2001 sets a security policy permitting access to the box document data for the owner of the user box and the user having executed a job for storing the document data into the user box.

In step S1605, the CPU 2001 determines whether the CPU 2001 can identify a user who has executed a job for storing the document data into the user box. If the CPU 2001 can identify the user having executed a job for storing the document data into the user box (YES in step S1605), the processing flow proceeds to step S1608. Otherwise (NO in step S1605), the processing flow proceeds to step S1609.

In step S1608, the CPU 2001 sets a security policy permitting access to the box document data for the user having executed the job for storing the document data into the user box.

If the CPU 2001 determines that the automatic setting of a security policy is not required for the box document data having no security policy (NO in step S1602), or if the CPU 2001 cannot identify the user having executed a job for storing the document data into the user box (NO in step S1605), the processing flow proceeds to step S1609. In step S1609, the CPU 2001 enables a user to manually set a security policy for the document, for example, using the operation screen illustrated in FIG. 2. Namely, the operation screen of FIG. 2 is displayed on the operation unit 2012 and a user can set a security policy.

If the processing for setting a security policy for all box document data (i.e., the processing of loop 1) is completed, the CPU 2001 terminates the processing of this routine. Thus, by executing the processing of FIG. 16, the security system according to the present embodiment can automatically set an appropriate security policy for box document data without a security policy.

A second exemplary embodiment of the present invention can perform control for box document data registered in the MFP 104 and including no security policy in association with user authentication. More specifically, if it is determined that a user has an administrative right, the present embodiment can set another security policy for document data. The present embodiment uses servers, host computers, and an MFP similar to those described in the above-described embodiment.

With the arrangement of the present embodiment, it is unnecessary to newly produce a security policy. Therefore, compared to the above-described embodiment, a user can simply set a security policy for document data.

Even if a user is in an environment using an application that cannot set a security policy for document data, the present embodiment enables the user to set, via an operation unit of the MFP 104 or a remote UI, a security policy for any box document data registered in the MFP 104. The present embodiment can realize a robust security system.

The present embodiment enables a user to set, via an operation unit of the MFP 104 or a remote UI, a security policy for the box document data. Thus, the present embodiment can provide a security system which is simple in operation and low in cost.

The present invention can be applied to a system including a plurality of devices or can be applied to a single apparatus.

Furthermore, software program code for realizing the functions of the above-described exemplary embodiments can be supplied directly, or from a remote place, to a system or an apparatus including various devices. A computer (or CPU or micro-processing unit (MPU)) in the system or the apparatus can execute the program to operate the devices to realize the functions of the above-described exemplary embodiments. Accordingly, the present invention encompasses the program code installable on a computer when the functions or processes of the exemplary embodiments can be realized by the computer.

In this case, the program code itself can realize the functions of the exemplary embodiments. The equivalents of programs can be used if they possess comparable functions. Furthermore, the present invention encompasses supplying the program code to a computer with a storage (or recording) medium storing the program code. In this case, the type of program can be any one of object code, interpreter program, and OS script data. A storage medium supplying the program can be selected from any one of a floppy disk, a hard disk, an optical disk, a magneto-optical (MO) disk, a compact disk-ROM (CD-ROM), a CD-recordable (CD-R), a CD-rewritable (CD-RW), a magnetic tape, a nonvolatile memory card, a ROM, and a DVD (DVD-ROM, DVD-R).

The method for supplying the program includes accessing a web site on the Internet using the browsing function of a client computer, when the web site allows each user to download the computer program of the present invention, or compressed files of the programs having automatic installing functions, to a hard disk or other recording medium of the user.

Furthermore, the program code constituting the programs of the present invention can be divided into a plurality of files so that respective files are downloadable from different web sites. Namely, the present invention encompasses world wide web (WWW) servers that allow numerous users to download the program files so that the functions or processes of the present invention can be realized on their computers.

Enciphering the programs of the present invention and storing the enciphered programs on a CD-ROM or comparable recording medium is an exemplary method when the programs of the present invention are distributed to the users. The authorized users (i.e., users satisfying predetermined conditions) are allowed to download key information from a page on the Internet. The users can decipher the programs with the obtained key information and can install the programs on their computers. When the computer reads and executes the installed programs, the functions of the above-described exemplary embodiments can be realized.

Moreover, an operating system (OS) or other application software running on a computer can execute part or all of actual processing based on instructions of the programs.

Additionally, the program code read out of a storage medium can be written into a memory of a function expansion board equipped in a computer or into a memory of a function expansion unit connected to the computer. In this case, based on an instruction of the program, a CPU provided on the function expansion board or the function expansion unit can execute part or all of the processing so that the functions of the above-described exemplary embodiments can be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-184844 filed Jul. 4, 2006, which is hereby incorporated by reference herein in its entirety.

What is claimed is:

1. A job processing apparatus to communicate with a security server configured to manage an access right to data, the job processing apparatus comprising:
   a storage unit configured to store data, the storage unit including a plurality of storage areas;

a managing unit configured to manage information indicating association between the plurality of storage areas and a plurality of users of the job processing apparatus, wherein each of the plurality of storage areas is associated with each of the plurality of users of the job processing apparatus;

a detection unit configured to determine whether an access right to data stored in the storage unit is managed by the security server; and a setting unit configured to, when the detection unit determines that the security server does not manage an access right to the data stored in a storage area of the plurality of storage areas in the storage unit, automatically set information for enabling the security server to manage an access right to the data such that a user, who is managed by the managing unit as being associated with a storage area where the data is stored, is allowed to access the data.

2. The job processing apparatus according to claim 1, further comprising:
   a job execution unit configured to execute a job for storing the data into the storage unit;
   an identifying unit configured to identify a user who has instructed execution of the job,
   wherein the setting unit automatically sets information for enabling the security server to manage an access right to the data so that the user identified by the identifying unit is allowed to access the data.

3. The job processing apparatus according to claim 2, further comprising: a manual setting unit configured to manually set information for enabling the security server to manage an access right to the data stored in the storage unit,
   wherein when the identifying unit cannot identify the user who has instructed execution of the job, the manual setting unit sets the information for enabling the security server to manage the access right to the data.

4. The job processing apparatus according to claim 1, further comprising: a manual setting unit configured to manually set information for enabling the security server to manage an access right to the data stored in the storage unit,
   wherein when the data is stored in a storage area other than the plurality of storage areas associated with each user of the job processing apparatus, a manual setting unit sets the information for enabling the security server to manage the access right to the data.

5. The job processing apparatus according to claim 1, further comprising:
   a job execution unit configured to execute a job for storing the data into the storage unit;
   an identifying unit configured to identify a user who has instructed execution of the job,
   wherein when the identifying unit can identify the user who has instructed execution of the job and the data is stored in any one of the plurality of storage areas, the setting unit automatically sets information for enabling the security server to manage an access right to the data so that both the user who has instructed execution of the job and a user associated with the storage area where the data is stored can access the data.

6. The job processing apparatus according to claim 1, further comprising:
   a manual setting unit configured to manually set information for enabling the security server to manage an access right to the data stored in the storage unit; and
   a setting information storage unit configured to store information indicating whether the setting unit automatically sets information for enabling the security server to manage an access right to the data,
   wherein when the detection unit determines that no access right to the data stored in the storage unit is being managed by the security server and the setting information storage unit stores information indicating that the information for enabling the security server to manage an access right to the data is not automatically set, the manual setting unit sets information for enabling the security server to manage an access right to the data.

7. A method for controlling a job processing apparatus to communicate with a security server configured to manage an access right to data, the method comprising:
   storing data into a storage unit, the storage unit including a plurality of storage areas;
   managing information indicating association between the plurality of storage areas and a plurality of users of the job processing apparatus, wherein each of the plurality of storage areas is associated with each of the plurality of users of the job processing apparatus;
   determining whether an access right to data stored in the storage unit is managed by the security server; and
   automatically setting, when it is determined that the security server does not manage an access right to the data stored in a storage area of the plurality of storage areas in the storage unit, information for enabling the security server to manage an access right to the data such that a user, who is managed as being associated with a storage area where the data is stored, is allowed to access the data.

8. A non-transitory computer-readable storage medium storing computer-executable process steps, the computer-executable process steps causing a computer to execute the method of claim 7.

* * * * *